United States Patent
Bäckman et al.

(10) Patent No.: US 12,172,913 B2
(45) Date of Patent: Dec. 24, 2024

(54) METHOD FOR REMOVING DISSOLVED ORGANIC COMPOUNDS FROM WASTEWATER

(71) Applicant: KEMIRA OYJ, Helsinki (FI)

(72) Inventors: Göran Bäckman, Helsingborg (SE); Sakari Halttunen, Espoo (FI); Pascal Morin, Québec (CA); Marina Shestakova, Espoo (FI)

(73) Assignee: Kemira Oyj, Helsinki (FI)

( * ) Notice: Subject to any disclaimer, the term of this patent is extended or adjusted under 35 U.S.C. 154(b) by 384 days.

(21) Appl. No.: 17/617,847

(22) PCT Filed: Jun. 10, 2020

(86) PCT No.: PCT/FI2020/050404
§ 371 (c)(1),
(2) Date: Dec. 9, 2021

(87) PCT Pub. No.: WO2020/249863
PCT Pub. Date: Dec. 17, 2020

(65) Prior Publication Data
US 2022/0234923 A1 Jul. 28, 2022

(30) Foreign Application Priority Data
Jun. 10, 2019 (FI) .................................... 20195492

(51) Int. Cl.
*C02F 3/12* (2023.01)
*C02F 101/10* (2006.01)
(Continued)

(52) U.S. Cl.
CPC ...... *C02F 3/1215* (2013.01); *C02F 2101/105* (2013.01); *C02F 2101/30* (2013.01);
(Continued)

(58) Field of Classification Search
CPC .............. C02F 3/1215; C02F 2101/105; C02F 2101/30; C02F 2103/28; C02F 2209/06;
(Continued)

(56) References Cited

U.S. PATENT DOCUMENTS

| 7,611,632 B1 | 11/2009 | Wang et al. |
| 2004/0149661 A1 | 8/2004 | Park et al. |

(Continued)

FOREIGN PATENT DOCUMENTS

| CN | 1412134 A | 4/2003 |
| CN | 105585112 A | 5/2016 |

(Continued)

OTHER PUBLICATIONS

Translation of Aesoy (EP1558528A1) (Year: 2003).*
(Continued)

*Primary Examiner* — Ekandra S. Miller-Cruz
(74) *Attorney, Agent, or Firm* — Meunier Carlin & Curfman LLC

(57) ABSTRACT

A method for removing biologically recalcitrant soluble organic compounds from wastewater simultaneously in an activated sludge process comprising an aeration tank and a solid-liquid separation unit, in which method at least one Al and/or Fe based inorganic metal coagulant is added to the wastewater in the activated sludge process and/or prior to conveying wastewater to an activated sludge process.

10 Claims, 1 Drawing Sheet

(51) Int. Cl.
*C02F 101/30* (2006.01)
*C02F 103/28* (2006.01)

(52) U.S. Cl.
CPC ...... *C02F 2103/28* (2013.01); *C02F 2209/06* (2013.01); *C02F 2209/08* (2013.01)

(58) Field of Classification Search
CPC ...... C02F 2209/08; C02F 1/5245; C02F 1/56; C02F 1/5263; Y02W 10/10
USPC .......................................................... 210/631
See application file for complete search history.

(56) References Cited

U.S. PATENT DOCUMENTS

| | | | |
|---|---|---|---|
| 2010/0300962 A1 | 12/2010 | Semenza | |
| 2011/0139714 A1 | 6/2011 | Geerts et al. | |
| 2019/0144321 A1* | 5/2019 | Likander | C02F 1/56 |
| | | | 210/609 |

FOREIGN PATENT DOCUMENTS

| | | |
|---|---|---|
| EP | 1558528 A1 | 8/2005 |
| EP | 2657194 A1 | 10/2013 |
| JP | H06142676 A | 5/1994 |
| JP | H10489 A | 1/1998 |
| JP | 2014028365 A | 2/2014 |
| JP | 2016059839 A | 4/2016 |
| WO | 2004041732 A1 | 5/2004 |
| WO | 2005035448 A1 | 4/2005 |
| WO | 2012028592 A1 | 3/2012 |
| WO | 2012065283 A1 | 5/2012 |

OTHER PUBLICATIONS

Translation of Akutsu (JPH10489A) (Year: 1996).*
International Search Report and Written Opinion mailed Sep. 21, 2020 in PCT/FI2020/050404 (11 pages).
Finnish Search Report dated Dec. 20, 2019 in FI Application No. 20195492 (2 pages).
Search Report issued by The State Intellectual Property Office of the Peoples Republic of China for corresponding application 2020800371289; dated Feb. 23, 2023. 4 pages (including translation).
English translation of office action regarding corresponding patent application CN2020800371289, issued on Sep. 26, 2023, 3p.
Collection of Sino-Japanese Cooperation Research Results on Pollution Prevention and Control Technology Research and Development. Department of Pollution Prevention and Control Technology at the Sino-Japanese Friendship Environmental Protection Center, p. 157, China Environmental Science Press, Nov. 2000. 4p with English translation.

* cited by examiner

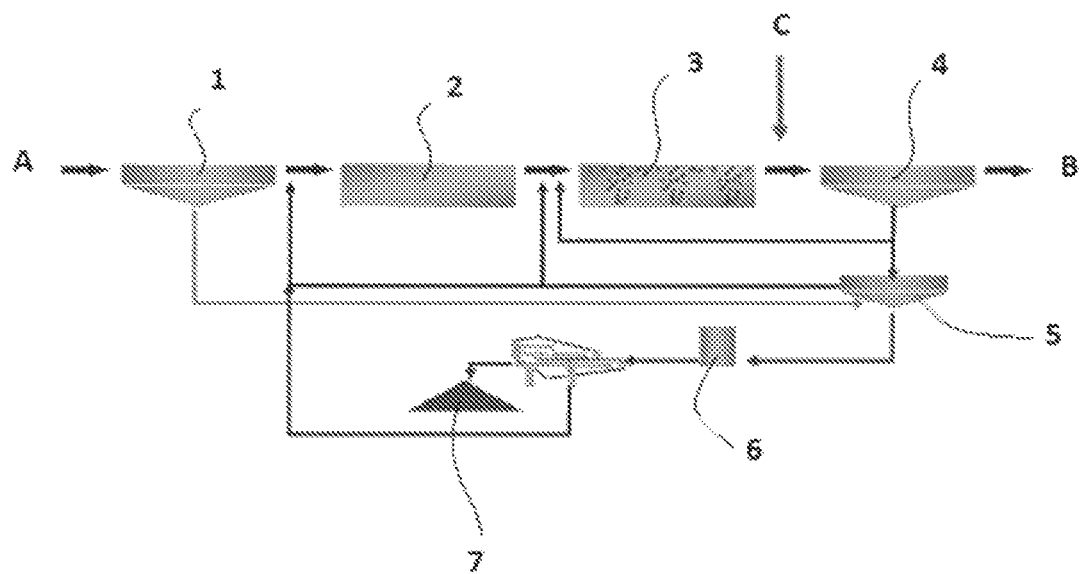

METHOD FOR REMOVING DISSOLVED ORGANIC COMPOUNDS FROM WASTEWATER

CROSS REFERENCE TO RELATED APPLICATIONS

This application is a United States National Phase Patent Application of International Patent Application Number PCT/FI2020/050404, filed on Jun. 10, 2020, and claiming priority of Finnish national application FI20195492 filed on Jun. 10, 2019, both of which are incorporated by reference herein in their entirety.

FIELD OF THE INVENTION

The present invention relates to a method for removing biologically recalcitrant soluble organic compounds from wastewater according to the independent claim presented below.

BACKGROUND OF THE INVENTION

Pulp and paper production are one of the most water-intensive industrial processes generating huge amounts of highly contaminated wastewater per tonne of paper or board produced. Chemical oxygen demand (COD) in pulp and paper wastewaters can reach up to 5000 mg/l or even higher. Conventional water treatment facilities of such effluents include primary clarifiers, which remove total suspended solids and other particulate matter; biological treatment, which removes the majority of dissolved organic matter; secondary clarifiers for activated sludge separation, and tertiary treatment either in the form of coagulation-flocculation process with solid-liquid separation unit, or ozonation, adsorption and others for removal of biologically recalcitrant soluble organic compounds, i.e. humic substances, such as lignin. The purpose of tertiary treatment is to provide a final treatment stage to further improve the effluent quality before it is discharged to the receiving environment.

Conventionally, coagulation with Al and Fe based inorganic metal salts or compounds is used in the coagulation-flocculation process in a tertiary wastewater treatment for residual COD removal. Due to high volumes of produced wastewaters in pulp and paper industry, the treatment with inorganic metal salts generates high amounts of inorganic sludge during wastewater treatment. Landfilling is the common method for sludge disposal. Current landfills however reach their capacity quickly, and due to more strict environmental legislation it is difficult to build new ones. Therefore, there is a need to find new ways to reduce the volume of sludge for disposal. Many mills choose sludge incineration as a solution of the problem. However, it leads, in turn, to high amounts of ash formation, which need to be landfilled afterwards.

Further, a construction of tertiary treatment equipment requires high investments in addition to large working areas.

Hence, there is a need to find novel cost-effective solutions for removal of biologically recalcitrant soluble organic compounds from wastewaters, which solutions meet environmental permits and safety levels and also reduce ash content when incinerating the sludge.

SUMMARY OF THE INVENTION

It is an object of the present invention to reduce or even eliminate the above-mentioned problems appearing in prior art.

The object of the present invention is to provide a novel method for removal biologically recalcitrant soluble organic compounds ("hard COD") from wastewater, which eliminates tertiary treatment facilities in the wastewater treatment plant. The object of the present invention is to provide an efficient and a simple method for hard COD removal by coagulation.

In order to achieve among others the objects presented above, the invention is characterized by what is presented in the characterizing parts of the enclosed independent claims.

Some preferred embodiments of the invention will be described in the other claims.

Typical wastewater treatment system comprises a primary sedimentation for removing total suspended solids and other particulate matter from wastewater, biological treatment for removing majority of dissolved organic matter and secondary sedimentation for activated sludge separation. The biological treatment is typically performed by using an aerobic biological process, whereby aerobic micro-organisms digest organic matter in wastewater, also called as an activated sludge process. Conventionally, the wastewater treatment system may further comprise a tertiary treatment step. However, the present invention provides an improved wastewater treatment removing the need of such tertiary treatment.

In this application, biologically recalcitrant soluble organic compounds, hard COD and humic substances refer to organic substances comprising lignin itself, lignin-type compounds and their disintegration products, and other organic compounds existing in wastewaters in pulp and paper industry or in municipal wastewaters.

The general arrangement of an activated sludge process comprises an aeration tank and a solid-liquid separation unit, usually referred to as "secondary clarifier" or "settling tank". The aeration tank typically serves as the bioreactor for organic matter removal. Air and/or oxygen is injected in the mixed wastewater and aerobic micro-organisms present in the aeration tank digest the majority of organic matter contained in the wastewater. The solid-liquid separation unit is typically arranged after the aeration tank to allow the biological flocs to settle, thus separating the biological sludge, also called as activated sludge, from the wastewater. In a preferred embodiment of the method according to the present invention, a solid-liquid separation unit comprises a settling tank. The biological process may also comprise an anaerobic treatment step, wherein anaerobic micro-organisms digest on the organic matter contained in the wastewater, producing e.g. biogas.

A typical method according to the invention for removing biologically recalcitrant soluble organic compounds from wastewater in an activated sludge process comprising an aeration tank and a solid-liquid separation unit, the method comprises adding at least one Al and/or Fe based inorganic metal coagulant to the wastewater in the activated sludge process and/or prior to conveying wastewater to the activated sludge process, wherein the dosage of Al and/or Fe based inorganic metal coagulant is at least 10 moles of said metal ions per 1 mole of soluble phosphate ion in wastewater, and separating the activated sludge and the precipitated organic compounds from wastewater in the solid-liquid separation unit.

It has been found that investment and maintenance costs of the tertiary treatment facilities can be saved by simultaneous COD coagulation in secondary clarifier(s) in an activated sludge process. According to an embodiment of the present invention, COD removal is carried out in an activated sludge process right after the aeration process before secondary clarification in an activated sludge process. In a preferred method of the present invention, Al and/or Fe based inorganic metal coagulant(s) conventionally used in the tertiary treatment are added to wastewater after an aeration process of the biological treatment for removing dissolved organic compounds efficiently. The precipitated organic substances can be removed by solid-liquid separation in second clarifier(s) simultaneously with the activated sludge and the treated wastewater may be discharged to the receiving environment without the additional tertiary treatment. Hence, the present invention provides enhanced treatment of wastewaters in secondary settling after aeration process. A method according to the present invention is performed in an activated sludge process comprising an aeration tank and a solid liquid separation tank, without further tertiary treatment step. Especially, it has been observed that a method according to the present invention is valuable for removing biologically recalcitrant soluble organic compounds from wastewaters originating from pulp and/or paper mills, wherein the elimination of tertiary treatment facilities brings out savings in the investment costs.

In common method for removing phosphorus from wastewater, the salts of aluminium or iron are dosed to wastewater, wherein phosphate forms precipitates with metal ions and is removed together with the sludge in the solid-liquid separation unit, such as secondary clarifiers. In chemical removal of phosphorus, 1 mole of Fe or Al reacts with 1 mole of P, based on the stoichiometric reactions of $Fe^{3+}$ and $Al^{3+}$ with P. In phosphorus removal, the required chemical dose is dependent on the phosphorus concentration. Typically, a dose of 1 mole of aluminium or iron per 1 mole of phosphorus is sufficient for removal of phosphorus. In some cases, moles of <5 or <7 of aluminium of iron per 1 mole P provide very efficient removal of phosphorus. In the present invention, it has been surprisingly found that simultaneous precipitation of COD can be performed in an activated sludge process, wherein the dosage of Al and/or Fe metal ions is at least 10 moles of said metal ions per 1 mole of soluble phosphate ion in wastewater to be treated. It has been observed that COD removal is efficient and therefore the need for tertiary treatment for COD removal is not required.

According to the present invention, Al and/or Fe based inorganic metal coagulant(s) may be used alone for coagulating dissolved organic compounds in an activated sludge process, typically after the aeration process and before secondary clarification in an activated sludge process. The effect of Al and/or Fe based inorganic metal coagulant(s) can be enhanced by using them in combination with a cationic polymer coagulant. Further, the coagulation-flocculation process may be improved using polymeric flocculant(s) in combination with the coagulant(s), wherein the floc formation is enhanced through uncoiling of polymers. Use of a cationic polymer coagulant can assist coagulation through charge neutralization and attraction of suspended solids, as well as reduce the dose of said inorganic metal coagulant(s) required to achieve similar COD removal efficiencies and allowing to keep pH of treated wastewater stable without significant fluctuation. It has been observed that COD can be removed by the method according to the present invention without significantly affecting pH of the wastewater. When using Al and/or Fe based inorganic metal coagulant(s) in combination with a cationic polymer coagulant, the Al and/or Fe based inorganic metal coagulant dose can be reduced which results reduced amounts of inorganic sludge formed during wastewater treatment and thus leads also to reduced amounts of ash formation after incineration of the sludge.

Further, it has been observed that the addition of Al and/or Fe based inorganic metal coagulant(s) in combination with a cationic polymer coagulant to wastewater in an activated sludge process does not affect pH of the wastewater, but the pH value remains substantially neutral. Therefore, the inorganic metal coagulant(s) and the cationic polymer coagulant(s) can be added during the biological treatment process without interfering the normal operation of the biological treatment.

A method according to the present invention is also observed to be efficient for removing colour from wastewaters. Coloured wastewaters may require colour removal before discharge into the environment and therefore the method according to the present invention also provides a practicable method for use in the activated sludge process.

The present invention especially provides a valuable method for removal of biologically recalcitrant soluble organic compounds and/or colour from wastewaters originating from pulp and paper mills having remarkable amounts of COD, but the method is suitable for all kind of wastewaters. Wastewater to be treated by the method according to the present invention may comprise municipal wastewater or it may be originated from industrial processes, such as pulp and/or paper making processes.

DESCRIPTION OF THE DRAWINGS

The invention will be described in more detail with reference to appended FIG. 1, which shows a flow chart of wastewater treatment process, an addition point for Al and/or Fe based inorganic metal coagulant according to the present invention is illustrated by arrow.

DETAILED DESCRIPTION OF THE INVENTION

In the method according to the present invention, at least one Al and/or Fe based inorganic metal coagulant is dosed to wastewater in an activated sludge process and/or prior to conveying wastewater to an activated sludge process. According to one preferred embodiment of the present invention, at least one Al and/or Fe based inorganic metal coagulant is added to wastewater after the treatment in an aeration tank in an activated sludge process, preferably after aeration tank and prior to secondary clarifier. According to an embodiment of the present invention at least one Al and/or Fe based inorganic metal coagulant may be added to wastewater after an aeration process when it is conveyed to a secondary clarifier and/or at least one Al and/or Fe based inorganic metal coagulant is added to a secondary clarifier. In an embodiment according to the invention, at least part of Al and/or Fe based inorganic metal coagulant is added in an activated sludge process, preferably at least part of Al and/or Fe based inorganic metal coagulant is added after an aeration tank to wastewater, more preferably after aeration tank and prior to secondary clarifier.

According to the present invention, Al and/or Fe based inorganic metal coagulant is dosed to wastewater in an amount of at least 10 moles of said metal ions per 1 mole of soluble phosphate ion in wastewater to be treated.

According to an embodiment of the present invention, at least one Al and/or Fe based inorganic metal coagulant is added in an amount of at least 20, preferably at least 30, 35, 40 or 50 moles or even 80 moles of said metal ions per 1 mole of soluble phosphate ion presence in wastewater to be treated. Soluble phosphorus content of the wastewater can be measured from wastewater in an aeration tank or after solid-liquid separation unit. Typical soluble P content in industrial wastewaters where phosphorus is added for the improvement of the activated sludge treatment, is less than 1 mg/L, more typically about 0.2 mg/L, measured from the aeration tank or after the solid-liquid separation unit.

According to an embodiment of the present invention, a cationic polymer coagulant is added to wastewater in addition to at least one Al and/or Fe based inorganic metal coagulant for enhancing coagulation and flocculation of dissolved organic compounds. At least part of the Al and/or Fe based inorganic metal coagulant(s) may be added prior to addition of the cationic polymer coagulant(s), or alternatively the cationic polymer coagulant may be added simultaneously with the Al and/or Fe based inorganic metal coagulant(s).

In an embodiment of the invention, the Al and/or Fe based inorganic metal coagulant(s) or a combination of the Al and/or Fe based inorganic metal coagulant(s) and the cationic polymer coagulant(s) are added directly to the aeration tank and/or to wastewater after the treatment in the aeration tank prior to the solid-liquid separation unit.

In an embodiment according to the present invention the Al and/or Fe based inorganic metal coagulant comprises aluminium sulphate, polyaluminium chloride, iron sulphate, ferric chloride or any combination of them. According to an embodiment of the present invention, in addition to the Al and/or Fe based inorganic metal coagulant(s) also other multivalent compounds may be added for improving the effect of the metal coagulant(s). According to an embodiment of the present invention, the multivalent compound may be zirconium, calcium and/or magnesium-based compound.

According to an embodiment according to the present invention a cationic polymer coagulant comprises at least one water-soluble cationic polymer for increasing flock size to be formed and for improving the separation of the precipitated organic substances from wastewater. For achieving improved coagulation and flocculation, the net charge of the cationic polymer is cationic. According to an embodiment of the present invention, the cationic polymer comprises synthetic cationic polymer and/or bio-based cationic polymer. Water-solubility of the cationic polymer means that the cationic polymer is substantially water-soluble in an aqueous medium. The aqueous medium may e.g. comprise acid for achieving dissolution.

According to an embodiment of the present invention, the cationic polymer comprises polyamine, polyvinylamine, polyethyleneimine, polydicyandiamide (polyDCD), polydiallyldimethylammonium chloride (polyDADMAC), poly (acryloyloxyethyl trimethylammonium chloride) (polyADAM-Cl), poly (methacryloyloxyethyl trimethylammonium chloride) (polyMADAM-Cl), poly (acrylamido-N-propyltrimethylammonium chloride) (polyAPTAC), poly (methacrylamidopropyltrimethylammonium chloride) (polyMAPTAC) and/or a copolymer of (meth) acrylamide and cationic monomers selected from diallyl dimethylammonium chloride (DADMAC), [2-(acrylamido) ethyl]trimethylammonium chloride, (ADAM-Cl), [2-(methacrylamido)ethyl]trimethylammonium chloride (MADAM-Cl), [3-(acryloyloxy)propyl]trimethylammonium chloride (APTAC) and/or [3-(methacryloyloxy)propyl]trimethylammonium chloride (MAPTAC). According to one preferred embodiment of the present invention, a cationic polymer comprises polyamine and/or polyDADMAC, preferably polyamine. Polyamines have typically higher cationicity than polyDADMAC and therefore polyamines provide same efficiency by smaller dosage as polyDADMAC. Polyamines are organic compounds having two or more primary amino groups. PolyDADMAC is a homopolymer of diallyldimethylammonium chloride (DADMAC).

According to an embodiment of the present invention, a cationic polymer may comprise bio-based cationic polymer comprising cationic polysaccharide, such as starch, cellulose, guar gum, dextran or the like, and/or chitosan.

In an embodiment according to the present invention the cationic polymer comprises cationic starch having degree of substitution (DS) value at least 0.3, preferably at least 0.4 for providing required cationicity for flocculation. In the context of the present application the term "cationic starch" means starch which has been modified by cationisation.

Cationic starches, which have a degree of substitution, DS, >0.3 are considered high cationic starches in this application. The high cationic starch is preferably only slightly degraded or non-degraded and modified solely by cationisation. Most preferably the used starch is non-degraded and non-cross-linked. There are a number of derivatising agents which may be used to give a positive charge density to starch. A cationic starch may have quaternary ammonium, quaternary phosphonium, tertiary sulfonium, or other corresponding substituent(s). Particularly preferred is a cationic charge, which is derivatised to contain a quaternary ammonium ion, for example by etherification of hydroxyl groups with a suitable etherifying agent having a cationic character such as the methyl chloride quaternary salt of N-(2,3-epoxypropyl)dimethylamine or N-(2,3-epoxypropyl)dibutylamine or N-(2,3-epoxypropyl)methylaniline. Suitable high cationic starches are of natural origin, for example, potato, rice, corn, waxy corn, wheat, barley, sweet potato or tapioca starch, potato starch being preferred.

Cationicity of cationic starch may be defined by using degree of substitution (DS). Degree of substitution defines how many substituted groups are contained in cationic starch, calculated per one anhydroglucose unit of starch. Degree of substitution of cationic starch, which is cationised with 2,3-epoxypropyltrimethyl-ammonium chloride, is typically calculated by using the nitrogen content of pure dry cationic starch, which does not contain any other nitrogen sources than the quaternary ammonium groups. Nitrogen content is typically determined by using commonly known Kjeldahl-method. Degree of substitution of cationic starch, which is cationised with 2,3-epoxypropyltrimethylammonium chloride may be calculated by using the following equation:

$$DS = (162 \times N\text{-}\%)/1400 - (N\text{-}\% \times 151.6).$$

where 162 is the molecular weight of an anhydroglucose unit (AHG), N-% is the nitrogen value in %, 1400 is the molecular weight of nitrogen multiplied by 100 and 151.5 is the molecular weight of 2,3-epoxypropyltrimethylammonium chloride.

Addition amounts of Al and/or Fe based inorganic metal coagulant and a cationic polymer coagulant may vary and they are dependent on the concentration of the coagulant products. In an embodiment according to the present invention, the dosage of the cationic polymer coagulant may be <50% of the dosage of inorganic metal salts, ppm in liquid form. According to an embodiment of the present invention cationic polymer coagulant and Al and/or Fe based inorganic metal coagulant are added in the ratio of about 0.1:1-3:1 or 0.1:1-1:1, calculated by active organic content divided by active metal salt content. The addition amounts are dependent on the used coagulants and/or the wastewater to be treated.

According to an embodiment of the present invention a polymeric flocculant may also be added in combination with the coagulant(s). The additional flocculant improves the separation of the precipitates and/or flocks, and thereby also enhances the removing of colour forming substances. A polymeric flocculant to be added may be cationic or anionic depending on the process conditions and other used coagulant(s) to be added. A polymeric flocculant may be any conventionally used flocculant. An activated sludge itself has an anionic charge and therefore, the additional dosage of the flocculant may not necessarily be required for achieving efficient flocculation in solid-liquid separation unit.

In a method according to an embodiment of the present invention, pH of the wastewater does not significantly change after the addition of the combination of the Al and/or Fe based inorganic metal coagulant(s) and a cationic polymer coagulant. In a preferred embodiment according to the present invention, the change in pH value may be less than 1 pH unit, preferably less than 0.5 pH unit. According to an embodiment of the present invention, pH of the wastewater is remained in the range of 6-9, preferably in the range of 6.5-7.8 after addition of said coagulant(s), and optionally flocculant(s).

In a method according to the present invention, Al and/or Fe based inorganic metal coagulant(s), and optionally a cationic polymer coagulant, are added in an amount that pH value of wastewater is remained in the pH range of 6-8.

Wastewater to be treated by the method according to the present invention may comprise municipal wastewater and/or wastewater originating from industrial processes. In a typical embodiment according to the present invention wastewater comprises industrial wastewater having soluble P content less than 1 mg/L, typically about 0.2 mg/L, measured from the aeration tank or after the solid-liquid separation unit. In one typical embodiment of the present invention, the wastewater originates from pulp and paper mill. The pulp and paper manufacturing generate huge amounts of wastewater with high chemical oxygen demand (COD). The method according to the invention provides an efficient method for COD removal. In an embodiment of the present invention, an amount of filtered COD in the treated wastewater is at least 10 mg/l, preferably 20 mg/l and more preferably 40 mg/l or 50 mg/l less than the filtered COD in the untreated wastewater prior the activated sludge process, samples filtered through a filter with pore size less than 1.6 μm before analysis to remove biological interference. A method of the present invention is also efficient for colour removal.

Some embodiment of the present invention will be described in more detailed with the reference to the schematic process chart presented in FIG. 1.

FIG. 1 shows schematically a flow chart of an activated sludge process of the wastewater treatment, where the method according to the present invention may be employed. FIG. 1 shows one possible process embodiment, the invention is not restricted to this embodiment, but FIG. 1 only illustrates possible addition point of the coagulant(s).

In a process illustrated in FIG. 1, wastewater to be treated A is first conveyed to a primary sedimentation 1 for removing total suspended solids and other particulate matter from wastewater. After the primary sedimentation wastewater may be conveyed to an anaerobic treatment 2 and further to an aeration tank 3 for removing majority of dissolved organic matter. The wastewater treatment process may comprise both anaerobic and aerobic treatment basins or it may comprise only aerobic treatment basin, the design and layout of the wastewater treatment processes may vary. After aerobic treatment in the aeration tank 3 the wastewater is conveyed to the solid-liquid separation unit 4 for sludge separation. The biological treatment is typically performed by using aerobic biological processes, whereby aerobic micro-organisms digest organic matter in wastewater, also called as an activated sludge process. As shown in FIG. 1, the arrangement of an activated sludge process comprises an aeration tank 3 where air and/or oxygen is injected in the wastewater and a solid-liquid separation unit 4, usually referred to as "secondary clarifier", to allow the biological flocs to settle, thus separating the activated sludge from the wastewater. The separated sludge may further be conveyed to a holding tank 5 and the clear filtrate from the top of the holding tank may be circulated back to the process. After solid-liquid separation in the solid-liquid separation unit 4, such as secondary clarifiers, a sludge is conveyed to the sludge treatment 6 and the treated wastewater B can be discharged from the treatment process. The sludge 7 may be transported to landfill. One preferred addition point of at least one Al and/or Fe based inorganic metal coagulant, and optionally a cationic polymer coagulant, is indicated with arrow.

Experimental Part

The following examples are merely illustrative of the principles and practices of the present invention and are not intended to limit the scope of the invention.

Measurement Methods and Instruments

A chemical oxygen demand (COD) is an indicative measure of the amount of oxygen that can be consumed by reactions in a measured solution. It is commonly expressed in mass of oxygen consumed over volume of solution which in SI units is milligrams per litre (mg/L). In the Example COD is measured using COD tester (HACH DRB 200).

The colour intensity is measured by spectrophotometers HACH DR5000 and HACH DR2800 from samples in ADMI units and in mg/l platinum as chloroplatinate ion (Pt/Co) by following instrument-specific instructions.

EXAMPLE 1

In this example, wastewater originating from paper mill was treated with different dosages of 4% solution of aluminium sulphate (Alum) in combination with aninonic FennoPol A 8675 Polymer flocculant (Kemira Oyj) dissolved in water to a 0.1% solution, or 4% solution of aluminium sulphate (Alum) in combination with anionic FennoPol A 8675 Polymer flocculant (Kemira Oyj) dissolved in water to a 0.1% solution and cationic polyamine coagulant (Fennofix FF C50, Kemira Oyj) dissolved in water to a 0.1% solution.

Reference measurement was outlet of secondary clarifier without any chemical addition.

Soluble phosphorous content of wastewater was 0.25 mg/L.

About 30 L amount of wastewater is collected in order to be able to carry out all tests using same wastewater sample. Wastewater is stored in cold room before starting tests. The whole sample lot is homogenized, and 1 L samples are taken for the coagulation tests. The coagulation and flocculation tests are performed by using miniflocculator Flocculator 2000. The sample is first stirred (400 rpm, 20 seconds) and the chemicals are added to the sample. The mixing of the sample is continued (40 rpm, 15-30 min) after addition of the chemicals. The analyses are made on the clear filtrate after settling away the sludge. The samples for determining COD and colour are taken after settling from the supernatant with pipette about 3 cm below the liquid level.

pH and conductivity were measured after settling. The results are shown at Table 1.

TABLE 1

| Treatment Program | molar ratio of Al/P | Colour ADMI | Colour Pt—Co | pH | Conductivity µS | COD mg $O_2/l$ |
|---|---|---|---|---|---|---|
| Reference | | 681 | 753 | 7.1 | 2700 | 162 |
| Alum 300 ppm + A8675 1 ppm | 55 | 258 | 294 | 6.5 | 2770 | 111 |
| Alum 500 ppm + A8675 1 ppm | 92 | 202 | 205 | 6.3 | 2800 | 50 |
| Alum 200 ppm + A8675 1 ppm + FF C50 10 ppm | 37 | 242 | 266 | 6.9 | 2730 | 113 |

When using 300 ppm of aluminium sulphate coagulant together with 1 ppm of FennoPol A 8675 flocculant, COD values decreased from 162 mg $O_2/l$ to 111 mg $O_2/l$ and colour reduced by 61 and 62% in Pt—Co and ADMI index values respectively. Increase of aluminium sulphate coagulant dose till 500 ppm and keeping FennoPol A 8675 dose at 1 ppm allows achieving about 70% of COD and colour removal. The dosage amount of polymeric flocculant Fennopol A 8675 is so small that its effect in the Examples is considered to be insignificant.

While decreasing aluminium sulphate coagulant dose from 300 to 200 ppm, keeping the dose of FennoPol A 8675 flocculant at 1 ppm level and adding of 10 ppm of cationic polyamine polymer FennoFix C50 to simultaneous precipitation in pulp and paper wastewater the similar COD and colour reduction values of 30 and 64% respectively can be achieved.

The invention claimed is:

1. A method for removing biologically recalcitrant soluble organic compounds from wastewater, the method comprising:
   providing an arrangement for activated sludge process comprising an aeration tank and a solid-liquid separation unit;
   conveying the wastewater into the arrangement for activated sludge process;
   adding at least one Al or Fe based inorganic metal coagulant and a cationic polymer coagulant to the wastewater in the arrangement for activated sludge process or prior to conveying the wastewater to the arrangement for activated sludge process to precipitate organic compounds, wherein at least part of the Al or Fe based inorganic metal coagulant is added prior to the addition of the cationic polymer coagulant, wherein a dosage of Al or Fe based inorganic metal coagulant is such that it provides at least 30 moles of Al- or Fe-ions per 1 mole of soluble phosphate ions in the wastewater; and
   separating activated sludge and precipitated organic compounds from the wastewater in the solid-liquid separation unit,
wherein the wastewater comprises wastewater originating from a pulp or paper mill.

2. The method according to claim 1, wherein the Al or Fe based inorganic metal coagulant and the cationic polymer coagulant are added directly to the aeration tank and/or to the wastewater after treatment in the aeration tank and prior to the solid-liquid separation unit.

3. The method according to claim 1, wherein the Al or Fe based inorganic metal coagulant comprises aluminium sulphate, polyaluminium chloride, iron sulphate, ferric chloride or any combination of them.

4. The method according to claim 1, wherein the cationic polymer coagulant comprises synthetic cationic polymer or cationic bio-based polymer or a combination of synthetic cationic polymer and cationic bio-based polymer.

5. The method according to claim 1, wherein, the cationic polymer coagulant comprises polyamine, polyepiamine, polyvinylamine, polyethyleneimine, polydicyandiamide (polyDCD), polydiallyldimethylammonium chloride (polyDADMAC), poly (acryloyloxyethyl trimethylammonium chloride) (polyADAM-Cl), poly (methacryloyloxyethyltrimethylammonium chloride) (polyMADAM-Cl), poly (acrylamido-N-propyltrimethylammonium chloride) (polyAPTAC), poly (methacrylamidopropyltrimethylammonium chloride) (polyMAPTAC) or a copolymer of (meth) acrylamide and cationic monomers selected from diallyl dimethylammonium chloride (DADMAC), [2-(acrylamido) ethyl] trimethylammonium chloride, (ADAM-Cl), [2-(methacrylamido) ethyl] trimethylammonium chloride (MADAM-Cl), [3-(acryloyloxy) propyl] trimethylammonium chloride (APTAC) or [3-(methacryloyloxy) propyl] trimethylammonium chloride (MAPTAC).

6. The method according to claim 1, wherein the cationic polymer coagulant comprises cationic starch having degree of substitution (DS) value at least 0.3.

7. The method according to claim 1, wherein at least one Al or Fe based inorganic metal coagulant is added in an amount of at least 35 moles of the metal ions per 1 mole of soluble phosphate ions in the wastewater.

8. The method according to claim 1, wherein pH of the wastewater is remained in the range of 6-9 after addition of Al or Fe based inorganic metal coagulant.

9. The method according to claim 1, wherein the cationic polymer coagulant and Al or Fe based inorganic metal coagulant are added in the weight ratio of 0.1:1-3:1, calculated by active organic content divided by metal content.

10. The method according to claim 1, wherein an amount of filtered chemical oxygen demand (COD) in treated wastewater after separating activated sludge and precipitated organic compounds is at least 10 mg/l, less than the filtered COD in the untreated wastewater prior the activated sludge process, samples filtered through a filter with pore size less than 1.6 µm.

* * * * *